United States Patent
Groth et al.

(10) Patent No.: US 9,457,498 B2
(45) Date of Patent: Oct. 4, 2016

(54) POWDER PRESS

(71) Applicant: Fette Compacting GmbH, Schwarzenbek (DE)

(72) Inventors: Andreas Groth, Schwarzenbek (DE); Andreas Teetzen, Schwarzenbek (DE); Holger Behns, Reinbek (DE)

(73) Assignee: Fette Compacting GmbH, Schwarzenbek (DE)

( * ) Notice: Subject to any disclaimer, the term of this patent is extended or adjusted under 35 U.S.C. 154(b) by 0 days.

(21) Appl. No.: 14/717,845

(22) Filed: May 20, 2015

(65) Prior Publication Data

US 2015/0336302 A1    Nov. 26, 2015

(30) Foreign Application Priority Data

May 20, 2014   (DE) .................. 10 2014 107 127

(51) Int. Cl.

| B29C 43/58 | (2006.01) |
| B30B 11/02 | (2006.01) |
| B30B 15/14 | (2006.01) |
| B29C 43/00 | (2006.01) |
| B30B 15/00 | (2006.01) |
| B29L 31/00 | (2006.01) |

(52) U.S. Cl.
CPC ............ *B29C 43/006* (2013.01); *B30B 11/02* (2013.01); *B30B 15/007* (2013.01); *B29C 2043/5808* (2013.01); *B29L 2031/772* (2013.01); *B30B 15/14* (2013.01)

(58) Field of Classification Search
CPC .................... B29C 43/006; B29C 2043/5808; B30B 11/02; B30B 11/04; B30B 15/007; B30B 15/14

USPC ......................... 425/149, 170, 352
See application file for complete search history.

(56) References Cited

U.S. PATENT DOCUMENTS

| 7,379,783 | B2 | 5/2008 | Popp |
| 7,379,784 | B2 | 5/2008 | Popp |
| 7,392,107 | B2 | 6/2008 | Popp |
| 7,799,273 | B2 | 9/2010 | Popp |
| 7,862,753 | B2 * | 1/2011 | Yamaguchi ........... B30B 11/005 264/40.5 |
| 8,186,988 | B2 * | 5/2012 | Baltruschat ............ B30B 11/04 425/149 |
| 8,660,680 | B2 | 2/2014 | Popp |
| 8,679,387 | B2 * | 3/2014 | Yoshioka ................. B30B 1/00 264/120 |
| 2010/0028478 | A1 | 2/2010 | Baltruschat et al. |
| 2014/0094949 | A1 | 4/2014 | Popp |

FOREIGN PATENT DOCUMENTS

| DE | 199 58 999 A1 | 4/2001 |
| DE | 103 01 224 A1 | 8/2004 |

(Continued)

*Primary Examiner* — James Mackey
(74) *Attorney, Agent, or Firm* — Young Basile Hanlon & MacFarlane, P.C.

(57) ABSTRACT

A powder press has a die plate that supports at least one die, at least one upper press tool at an upper tool carrier, at least one lower press tool at a lower tool carrier, at least one upper linear drive acting on the upper tool carrier, at least one lower linear drive acting on the lower tool carrier or on the die plate, possibly a further linear drive acting on a transverse tool carrier, and a force measuring apparatus. The force measuring apparatus measures forces acting on the upper, lower and/or transverse tool carrier. Each linear drive may be at least two linear drives engaging eccentrically at the upper or lower tool carrier, respectively. The parallel spaced linear drives act together on a force transferring element, and the force transferring element acts on a tool carrier via spaced piezoelectric sensors.

14 Claims, 1 Drawing Sheet

(56) References Cited

FOREIGN PATENT DOCUMENTS

| DE | 10 2008 035 301 B3 | 3/2010 |
| DE | 10 2009 004 620 A1 | 7/2010 |
| DE | 10 2012 010 767 A1 | 12/2013 |
| DE | 10 2012 019 312 A1 | 4/2014 |
| EP | 2 123 435 A1 | 11/2009 |

* cited by examiner

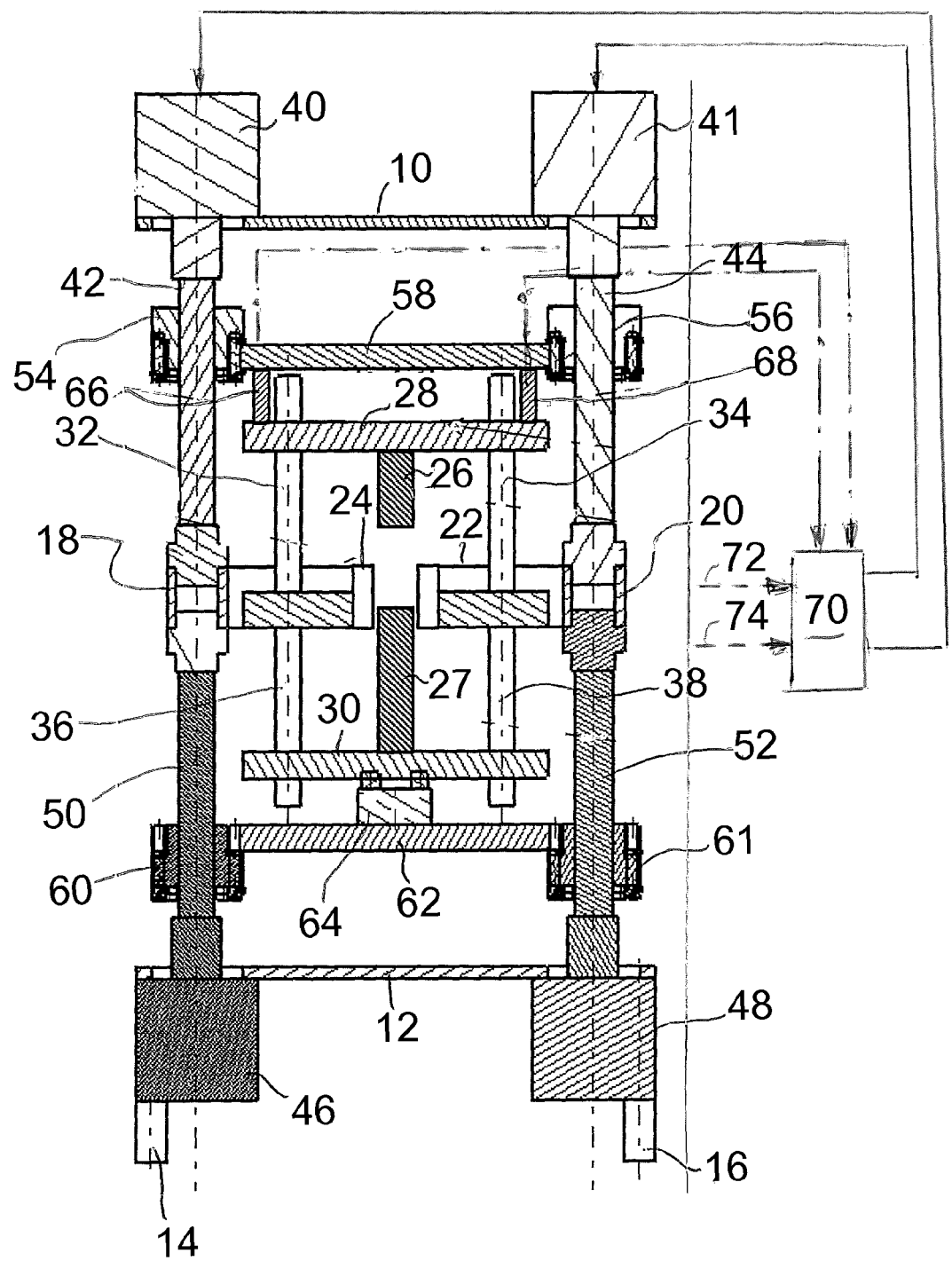

POWDER PRESS

CROSS-REFERENCE TO RELATED APPLICATION

This application claims priority to German Patent Application No. 10 2014 107 127.1, filed May 20, 2014, the content of which is incorporated herein in its entirety by reference.

FIELD OF THE DISCLOSURE

The disclosure relates to a powder press.

BACKGROUND

A typical powder press, for metal or ceramic powder for example, has a die plate that supports at least one die. An upper press tool and/or a lower press tool is assigned to the die, wherein the press tools are held at a respective tool carrier. The upper tool carrier, the lower tool carrier or the die plate are actuated by at least one linear drive so that the press tools, for instance press punches, are guided into the die filled with powder, or respectively out of the die in order to eject finished pellets out of the dies. To the extent that the tool carriers or the die plate can be moved vertically, each is guided in a press frame. Hydraulic cylinders or electric drives come into consideration as linear drives. With the latter, a spindle drive is used, whose spindle interacts with the shaft of an electric motor and whose spindle nut interacts with the tool carrier.

SUMMARY

For monitoring the pressing process, it is desired to measure the pressing forces. Indirect measurement of the pressing forces can be achieved, for example, using the pressure in the hydraulic cylinder, or with electric drives using the motor current or the torque. The expansion of the press frame during the pressing procedure can also be determined. Measurement of the pressing forces directly in the force flow can be achieved using strain gauges. Conventional measurement methods, however, have disadvantages. With the use of a single pressure sensor in the press axis it is not possible to determine a nonuniform application of force. Accordingly, it is also not possible to generate a desired nonuniform application of force in a controlled manner.

With an indirect determination of the force using measurement variables from the drives, such as pressure ratios or currents, it is possible to detect or generate a nonuniform application of force if a plurality of drives acts on a press axis. However, in the case of small forces, the indirect detection of force is extremely inaccurate because external disturbance variables, such as the friction in the cylinder, cannot be subtracted.

With the use of force sensors having strain gauges, the required installation space is ever greater with increasing measurement ranges because the force sensors become increasingly larger.

The force measurement must be capable of determining the maximum possible force in the press. Here, with the measurement of smaller forces, for instance the ejection force of the pellets, large percentage measurement errors arise due to the measurement technology. If widely varying force values in a press cycle are to be measured with the same accuracy, a plurality of sensors must be installed. A measurement using only one sensor having a measurement range switch yields only a small improvement in accuracy.

Due to the size of force sensors, it often occurs that only a single sensor is installed, e.g., due to space reasons, with which it is not possible to detect a nonuniform application of force.

In contrast, the teachings herein describe a powder press having a sufficiently precise measurement of the pressing force that can be performed in a space-saving manner over a large measurement range. In particular, for example, tilting of a press tool with respect to its press axis is detected in a simple manner.

With embodiments of the invention, a piezoelectric sensor is connected along the force path of at least one linear drive to the upper press tool and/or to the lower press tool and/or to a transverse press tool. These sensors can provide a force measuring apparatus.

The use of a piezoelectric sensor along each force path has several advantages. On one hand, a piezoelectric sensor is very small. Thereby, a plurality can be installed in parallel with a press axis. An additional advantage is a large measurement range. Very precise measurement results can be achieved even in the case of smaller forces because the measurement accuracy of piezoelectric force sensors is nearly constant over the entire measurement range. Thereby it is possible to detect widely different forces in a press cycle, such as the main pressing force and the ejection force, with uniform measurement accuracy.

In order to introduce different forces in a press axis, it is common to assign at least two drives to a press axis. The two drives are spaced apart and act on the tool carrier. In this context, an embodiment of the invention provides that the upper press axis has at least two linear drives engaging eccentrically at the upper tool carrier. Alternatively or additionally, the lower press axis has at least two linear drives engaging eccentrically at the lower tool carrier. In each case, a piezoelectric sensor is connected along the force path between the upper and/or the lower linear drives and the upper and/or lower press tool. With the use of a plurality of piezoelectric sensors for each press axis, it is possible to measure a nonuniform application of force. The nonuniform application of force is determined by monitoring and comparing the detected force values for each press axis. Thereby, it is possible to detect a tilting of the press tool. If undesired forces are ascertained with the detection of force, this indicates a tilting and axial movement can be interrupted. This serves to protect mechanical components such as the press tool, a press tool adapter, a drive spindle, or a drive rod of a hydraulic cylinder.

In another implementation, possibly a further linear drive for a transverse axis is included. A force measuring apparatus can measure forces at least at the upper and/or lower press axis and/or at the transverse axis. The upper press axis and/or the lower press axis may have least two linear drives engaging eccentrically at the upper and/or lower tool carrier.

Using spaced piezoelectric sensors makes it possible to monitor for stiffness, for instance in guidance. If different forces arise with the movement of along a press axis, or if these forces change during the same movement process over a longer period of time, this could indicate stiffness.

It is also possible to knowingly apply a nonuniform pressing force by means of a plurality of drives and measurement of the application of force at a plurality of locations in the force flow. This can be advantageous with forming asymmetrical pellets.

In some implementations, parallel spaced linear drives act together on, for example, a horizontal force transfer element.

The force transfer element then acts on the tool carrier via spaced piezoelectric sensors. The piezoelectric sensors are preferably arranged symmetrically to the vertical axis of the press.

With two piezoelectric sensors, according to one design of the invention, these are arranged symmetrically and in a diametric plane that passes through the vertical axis of the press.

The linear drives used can be conventional drives, for instance hydraulic cylinders or electric drives having spindle drives. For the latter case, one design of the invention provides that upper and/or lower linear drives have a spindle drive whose spindle is driven by an electric motor and whose spindle nut engages at the horizontal force transfer element. Alternatively, according to another design of the invention, the spindle nut of a spindle drive can be driven by an electric motor while the threaded spindle engages at the horizontal force transfer element.

An exemplary embodiment of the invention is explained in more detail in the following using a drawing.

BRIEF DESCRIPTION OF THE DRAWINGS

FIG. 1 shows a schematic partial section of a powder press according to an embodiment of the invention.

DETAILED DESCRIPTION

The powder press shown in FIG. 1 is used for example for metallic powder or ceramic powder and has a frame that is represented only with individual parts. The frame has an upper carrier plate 10 and a lower carrier plate 12, and is supported on the ground using feet 14, 16. The frame also has two bearing components 18, 20, which retain a die plate 22. The die plate 22 receives a die 24. Press tools interact with the die 24. For example, upper press punch 26 and a lower press punch 27 interact with the die 24. Each of the press punches 26, 27 is attached at a respective tool carrier plate 28, 30. The upper tool carrier plate 28 is guided by two spaced guide rods 32, 34, and the lower tool carrier plate 30 by guide rods 36, 38, which effect a sliding guide. For this purpose customary guide adapters are provided, which are not represented here.

Two electric motors 40, 41, which drive a respective threaded spindle 42, 44, are attached spaced on the upper carrier plate 10. The threaded spindles 42, 44 are rotatably mounted in respective ones of the bearing components 18, 20. Two electric motors 46, 48, which respectively drive threaded spindles 50, 52, are attached at the lower carrier plate 12. The free ends of the threaded spindles 50, 52 are mounted rotatably in respective ones of the bearing components 18, 20.

Spindle nuts 54, 56, between which extends a force transfer plate 58 that is connected to the spindle nuts 54, 56, sit on respective threaded spindles 42, 44. Spindle nuts 60, 61, between which extends a force transfer plate 62 that is connected to the spindle nuts 60, 61, sit on respective threaded spindles 50, 52. The force transfer plate 62 acts via a block 64 on the carrier plate 30. The force transfer plate 58 acts via two spaced piezoelectric sensors 66, 68 on the tool carrier plate 28.

It can be seen that two parallel spaced force paths act on the tool carrier plate 28, or respectively tool carrier plate 30. Thus, it is possible either to exert a uniform force on the press punch 26 for travel along a press axis, or respectively press punch 27 for travel along a press axis, through uniform application of force in both force paths. If desired, different forces can also be applied. By using the parallel spaced piezoelectric sensors 66, 68, which engage relatively far on the outside at the tool carrier plate 28, it is possible to monitor and control the forces being exerted on the press punch 26. Undesired different forces, which could lead to a tilting of the press punch 26 relative to its press axis, are therefore detected automatically. On the other hand, a different exertion of force on the press punch 26 can be desirable in order to exert different forces on the pellet. These forces can therefore be controlled using the piezoelectric sensors 66, 68.

Piezoelectric sensors have a very wide, relatively precise measurement range. Therefore, it is possible using the piezoelectric sensors 66, 68 to precisely determine, for example, the maximum pressing force. It is also possible to determine the ejection force using the piezoelectric sensors. In this case, piezoelectric sensors would be brought into interaction with the lower tool carrier plate 30 and the force transfer plate 62 in a like manner as shown for the upper tool carrier plate 28. Finally, it is also possible for the die plate 22 to interact with piezoelectric sensors. This is useful for the case where the lower press punch 27 is stationary, and the ejection is brought about via height adjustment of the die plate 22.

The piezoelectric sensors 66, 68 are connected to a regulation device 70, which is indicated by dotted lines. The regulation device 70 is additionally connected to the electric motors 40, 41. Predetermined target values for the forces, which should be exerted on the tool carrier plate 28 via the piezoelectric electric sensors 66, 68, are stored in the regulation device 70. If these forces are unequal, and this is not desired, a controller of the regulation device 70 issues a correction signal to the appropriate electric motor 40 or 41. Tilting is thereby immediately prevented. However it is also possible to apply a desired asymmetric force on the tool carrier plate 28, for example with the production of asymmetrical pellets. In every case it is possible, using the regulation device shown, to precisely control the force that is to be exerted by the electric motors 40, 41 on the tool carrier plate 28 via the corresponding spindle drives.

It is understood that an appropriate control or regulation can also be performed for the lower electric motors 46, 48.

Further, although only two press tools are shown, by example upper press punch 26 and a lower press punch 27, a transverse press tool may be located transverse to the upper press punch 26 and the lower press punch 27 that is supported by a transverse tool carrier in a like manner as the press punches 26, 27. A further linear drive may be located in a transverse plane to the linear drives 40, 42, 54 and/or 41, 44, 56 and/or 46, 50, 60 and/or 48, 52, 61 to apply force to the transverse tool carrier for travel along a transverse axis. Piezoelectric sensors may be used to measure the force in a like manner as described above.

The regulation device 70 may be incorporated within a computer or other computing device including a non-transitory storage medium to store the target values for the forces and, in some cases, an operating program to perform the operations described above. The controller of the regulation device 70 may be a microprocessor, central processing unit, or other hardware that can process the stored target values and the measured values to perform the operations described above, in some cases responsive to operation of the operating program. In some implementations, the regulation device 70 may be considered to be part of a force measuring apparatus supplied by the piezoelectric sensors 66, 68.

A path-measurement device can also be assigned to the linear drives, as they are indicated in the FIGURE, or also to one or more of the tool carrier plates 28, 30. The dotted arrows 72, 74 represent the path-measurement signals issued into the regulation device 70 in this way. The consideration of path-measurement signals with the control or regulation of a press is known. It can be consulted in addition to the described regulation.

The spindle drive represented in FIG. 1 can also be designed such that the spindle nut is coupled to an electric motor and is rotated while it is axially unmovable. The spindle rod thereby moves forward or backward and can act on a respective force transferring element 58, 62, in order to actuate the upper and/or lower punch.

The piezoelectric sensors 66, 68 are very small and can therefore be installed at the desired locations with small installation space.

What is claimed is:

1. A powder press, comprising:
    a die plate, which supports at least one die;
    an upper press tool at an upper tool carrier;
    a lower press tool at a lower tool carrier;
    an upper linear drive that acts on the upper tool carrier; and
    a lower linear drive that acts on at least one of the lower tool carrier or the die plate; wherein at least one of:
    the upper linear drive comprises at least two linear drives engaging eccentrically at the upper tool carrier, the at least two linear drives forming parallel spaced upper linear drives acting together on an upper force transferring element, and the upper force transferring element acting on the upper tool carrier via spaced piezoelectric sensors; or
    the lower linear drive comprises at least two linear drives engaging eccentrically at the lower tool carrier, the at least two linear drives forming parallel spaced lower linear drives acting together on a lower force transferring element, and the lower force transferring element acting on the lower tool carrier via spaced piezoelectric sensors.

2. The powder press according to claim 1, wherein the piezoelectric sensors are arranged symmetrical to a vertical axis of the powder press.

3. The powder press according to claim 1, wherein the piezoelectric sensors comprise two piezoelectric sensors arranged symmetrical in a diametrical plane that passes through a vertical axis of the powder press.

4. The powder press according to claim 1, wherein at least one of:
    each of the parallel spaced upper linear drives has a spindle drive, a spindle of which is driven by an electric motor and a spindle nut of which engages at the upper force transferring element; or
    each of the parallel spaced lower linear drives has a spindle drive, a spindle of which is driven by an electric motor and a spindle nut of which engages at the lower force transferring element.

5. The powder press according to claim 1, wherein at least one of:
    each of the parallel spaced upper linear drives has a spindle drive, a spindle nut of which is driven by an electric motor and a spindle of which engages at the upper force transferring element; or
    each of the parallel spaced lower linear drives has a spindle drive, a spindle nut of which is driven by an electric motor and a spindle of which engages at the lower force transferring element.

6. The powder press according to claim 1, wherein at least one of:
    the upper force transferring element has a beam or a plate; or
    the lower force transferring element has a beam or a plate.

7. The powder press according to claim 1, wherein at least one of:
    the upper tool carrier has a beam or a plate; or
    the lower tool carrier has a beam or a plate.

8. The powder press according to claim 1, further comprising:
    a control or regulation device that is connected to the piezoelectric sensors, compares sensor signals to predetermined target force values stored in the regulation device, and with a deviation of the sensor signals from the target force values, issues correction adjustment signals to at least one of the upper linear drive or the lower linear drive.

9. The powder press according to claim 8, further comprising:
    a path-measurement device assigned to at least one of the upper linear drive, the lower linear drive, the upper tool carrier or the lower tool carrier.

10. The powder press according to claim 9, wherein the path-measurement device is connected to the regulation device.

11. The powder press according to claim 9, wherein the path-measurement device measures paths of both of the upper linear drive and the lower linear drive.

12. The powder press according to claim 1, wherein at least one of:
    each of the parallel spaced upper linear drives has a spindle drive, a spindle of which is driven by an electric motor and a spindle nut of which engages at the upper force transferring element, the upper force transferring element being a horizontal upper force transferring element; or
    each of the parallel spaced lower linear drives has a spindle drive, a spindle of which is driven by an electric motor and a spindle nut of which engages at the lower force transferring element, the lower force transferring element being a horizontal lower force transferring element.

13. The powder press according to claim 1, wherein at least one of:
    each of the parallel spaced upper linear drives has a spindle drive, a spindle nut of which is driven by an electric motor and a spindle of which engages at the upper force transferring element, the upper force transferring element being a horizontal upper force transferring element; or
    each of the parallel spaced lower linear drives has a spindle drive, a spindle nut of which is driven by an electric motor and a spindle of which engages at the lower force transferring element, the lower force transferring element being a horizontal lower force transferring element.

14. The powder press according to claim 1, further comprising:
    a path-measurement device assigned to at least one of the upper linear drive, the lower linear drive, the upper tool carrier or the lower tool carrier.

* * * * *